United States Patent
Jeganathan et al.

(10) Patent No.: US 8,501,053 B2
(45) Date of Patent: Aug. 6, 2013

(54) MULTI COLOR, PHOTOACTIVE, COLOR CHANGING COMPOSITIONS AND UV DOSIMETERS

(75) Inventors: Suruliappa Gowder Jeganathan, Chadds Ford, PA (US); Neil Colin William Forsythe, Landenberg, PA (US); Vincent Livoti, Hopewell Junction, NY (US); Walter Taplin, Hockessin, DE (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/122,065

(22) PCT Filed: Sep. 22, 2009

(86) PCT No.: PCT/EP2009/062225
§ 371 (c)(1),
(2), (4) Date: Aug. 17, 2011

(87) PCT Pub. No.: WO2010/037660
PCT Pub. Date: Apr. 8, 2010

(65) Prior Publication Data
US 2011/0293908 A1    Dec. 1, 2011

Related U.S. Application Data

(60) Provisional application No. 61/194,959, filed on Oct. 2, 2008.

(51) Int. Cl.
| | | |
|---|---|---|
| G02B 5/23 | (2006.01) |
| B41M 5/00 | (2006.01) |
| B44C 1/17 | (2006.01) |
| B41M 3/10 | (2006.01) |
| B44C 5/04 | (2006.01) |
| G03G 7/00 | (2006.01) |

(52) U.S. Cl.
USPC ...... 252/586; 427/160; 428/195.1; 428/211.1

(58) Field of Classification Search
USPC ............ 252/586; 427/160; 428/195.1, 211.1; 436/57; 524/23, 128, 247, 543
See application file for complete search history.

(56) References Cited

U.S. PATENT DOCUMENTS

| | | | |
|---|---|---|---|
| 4,663,157 A | | 5/1987 | Brock |
| 5,206,118 A | * | 4/1993 | Sidney et al. ............... 430/343 |
| 5,688,858 A | | 11/1997 | Quednau et al. |
| 6,312,672 B1 | | 11/2001 | Coolbaugh et al. |
| 6,409,998 B1 | | 6/2002 | Candau et al. |
| 7,153,494 B2 | | 12/2006 | Chodorowski-Kimmes et al. |
| 2003/0021847 A1 | | 1/2003 | Baxter et al. |
| 2006/0167146 A1 | * | 7/2006 | Rotzinger et al. ............ 524/128 |

FOREIGN PATENT DOCUMENTS

| | | | |
|---|---|---|---|
| JP | 4-36381 | * | 2/1992 |
| WO | WO2005075978 A2 | * | 8/2005 |
| WO | WO2007088104 A1 | * | 8/2007 |

OTHER PUBLICATIONS

Co-pending U.S. Appl. No. 12/079,607 and 12/079,606.

* cited by examiner

*Primary Examiner* — Bijan Ahvazi
(74) *Attorney, Agent, or Firm* — Shiela A. Loggins

(57) ABSTRACT

A multi color, photoactive, color changing plastic, coating or ink, composition comprising both a photochromic material and a photosensitive chromogenic system is provided which will undergo a sequence of color changes upon exposure to ultraviolet radiation. Also provided is an ultraviolet indicator or dosimeter comprising the color changing composition.

13 Claims, No Drawings

MULTI COLOR, PHOTOACTIVE, COLOR CHANGING COMPOSITIONS AND UV DOSIMETERS

This application claims benefit of U.S. provisional application Ser. No. 61/194,959 filed Oct. 2, 2008, the disclosure of which is incorporated herein in its entirety by reference.

A multi color, photoactive, color changing composition comprising both a photochromic material and a photosensitive chromogenic system is provided which undergoes a sequence of color changes upon exposure to ultraviolet radiation. Also provided is a plastic article, coating or ink formulation, and an ultraviolet indicator or dosimeter comprising the color changing composition.

There are many reasons to monitor ultraviolet (UV) light, i.e., light with wavelengths below about 400 nm. The harmful effects of the UV component of terrestrial sunlight, light with wavelengths from about 280 to about 400 nanometers, are now widely recognized and linked to a number of human health issues such as skin cancer, cataracts, sunburn, aging of the skin etc. Naturally occurring ultraviolet light is also responsible for the degradation of a variety of materials, including plastics, coatings, dyes etc.

On the other hand, UV light has a variety of valuable uses in commerce and industry, for example, coatings and other polymer systems are cured with UV radiation, and artificial sources of UV radiation are commonly employed in a variety of commercial fields.

Given that UV light can not be seen or otherwise readily detected by human senses, devices for monitoring and measuring exposure to ultraviolet radiation have been developed. These devices may simply alert one to the presence of UV light, they may provide qualitative information about the intensity or the accumulated amount of UV radiation a person or material is or has been exposed to, or the device may quantitatively measure the amount of exposure to UV radiation. These devices can be used to, for example, warn one about the amount of potentially harmful UV light to which a person or article is being exposed, or it may signal to a manufacturer how much potentially useful UV radiation has been applied to a UV curable coating or plastic.

As used herein, a UV indicator is a device that alerts one to the presence of a defined minimum intensity of UV radiation; a dosimeter is a device that indicates the amount of UV radiation to which a subject has been exposed. A dosimeter may be semi-quantitative. For example, a dosimeter may contain an indicator which changes color when a predetermined level of exposure, or dose, of UV radiation has been encountered, or a continuum of color changes may be correlated to specific amounts of cumulative UV doses.

UV indicators and dosimeters using photochromic materials are known. Photochromic materials, for example, photochromic dyes, change color upon exposure to activating light, in this case UV light, and often revert to the original color when the activating light is removed. In many cases, the unactivated, original material is colorless or clear. As the activated forms of many photochromic dyes are somewhat unstable, the amount of degradation of the dye, determined for example, by a decrease in the color intensity of the activated form, can be used as a measure of the amount of UV exposure. Thus, a simple, semi-quantitative dosimeter may be prepared using photochromic materials.

For example, U.S. Pat. No. 5,914,197, incorporated herein in its entirety by reference, discloses a wristband comprising a reversible photochromic dye wherein the color intensity form upon exposure can be used as a measure of the intensity of the UV light present.

U.S. Pat. No. 4,705,046, incorporated herein in its entirety by reference, discloses a device for the qualitative measurement of UV radiation received by the skin which consists of a laminar strip comprising a photochromic material and a reference material. The reference material is suitably a dye which matches closely the color of the photochromic material after exposure to a pre-determined quantity of UV radiation. One can visually assess exposure to UV radiation by a direct comparison of the color densities of the photochromic material and the reference material during exposure to sunlight.

Other similar devices are found in U.S. Pat. Nos. 6,132,681; 6,818,904; 5,986,273; 5,589,398; 3,787,687, 5,117,116, 4,659,649, 5,296,275, 3,903,423, 5,581,0906 and 734,440, the disclosures which are incorporated herein in their entirety by reference; US Pub Pat Appl No. 2001/0019110, 2004/0109789 and 2002/0022008 the disclosures which are incorporated herein in their entirety by reference; and WO 2007/137936.

Chromogenic materials can also be used in simple dosimeters. Chromogenic systems comprise a color former and an activator. Such systems are commonly encountered in pressure sensitive color formation. For example, an activator is encapsulated to prevent contact with the color former. Applied pressure breaks the capsule releasing the activator causing the reaction which gives rise to color.

Chromogenic systems are also known which are activated by UV light. For example, onium salts, photolatent acids and photolatent bases and many other UV sensitive activators have been used with color formers in a variety of commercial systems. In these systems, the amount of acid generated, and hence the amount color formation, is determined by the level of the UV light dose. Thus, a system can be developed where the amount of color developed is related to the UV dose.

U.S. Pat. No. 5,612,541, incorporated herein in its entirety by reference, discloses UV dosimeters comprising a chromogenic system. In one embodiment, a color former and an encapsulated Lewis acid activator with poor color stability are applied as a layer of a UV dosimeter. Applied pressure releases the Lewis acid and an initial zero time color is created. Due to the color instability of the Lewis acid, the intensity of the newly formed color substantially decreases over the course of a few hours when exposed to sunlight. In an alternate embodiment, an initially clear photoactive chromogenic system is used which changes into increasingly darker hues when exposed to UV light. Matching the dosimeter color of either embodiment during or after UV exposure with the colors on a reference chart, correlated with the hue of the chromogenic color system after specific UV doses, gives a measure of the amount of UV exposure.

The use of UV activated chromogenic dosimeters in certain applications such as applications where skin contact is possible, can be complicated by the use of potentially harmful or toxic photo activators. WO 2008022952 (equivalent to co-pending U.S. patent application Ser. No. 12/310,260 which is incorporated herein by reference), discloses an UV dosimeter which comprises a color former and a photolatent acid or base wherein the photolatent acid is a sulfonyl oxime ester.

The photo sensitive activators of a chromogenic system can also be extremely sensitive and highly reactive. For example, in the system of WO 08022952, full color development, such as from clear to magenta, can occur within 2 minutes under UV irradiation. This can be a problem in UV dosimeters where a slower change is desirable such as in dosimeters used to alert one to overexposure of the skin to sunlight wherein the device needs to operate over one or more hours.

U.S. Pat. No. 5,627,278, incorporated herein in its entirety by reference, discloses that phenol derivatives can be used as photo sensitive activators for chromogenic color formers.

Phenols are weak acids that become stronger acids when exposed to UV radiation and can be used in photoactive chromogenic systems. Photo-latent acid phenol activators can be selected which are less responsive to UV light and require a higher UV dose to effect complete color change, than, for example, the sulfonyl oxime ester above.

One difficulty with many of the simple UV dosimeters based on a particular chemistry, e.g., photochromic or chromogenic, is that the color changes are typically related to intensity changes of a single color, for example, the gradual development of a color from an initially clear substrate or the gradual fade from a colored material to clear. This may make accurate reading of the dose level difficult and it may cause the user some uncertainty about whether it is working.

The present invention provides a multi color photoactive color changing composition comprising both a photochromic material and a photosensitive chromogenic system. The composition takes advantage of the difference in the rate of color formation of an organic photochromic material, the rate of color fade of the photochromic material and the rate of color formation of the chromogenic material to undergo a sequence of color changes upon UV exposure. The composition is readily incorporated into, e.g., plastics and coatings including inks. In one embodiment, a UV dosimeter is provided which upon exposure to UV radiation changes color from clear to blue due to the photochromic dye, and upon continued exposure to UV, the blue color fades and red color form due to the slower forming chromogenic system. In another embodiment, a UV dosimeter is provided comprising a yellow pigment, a photochromic dye and a chromogenic system, which upon exposure to UV radiation changes color from yellow to green to red. By employing more than one color change, the instant dosimeter provides a measure of intermediate dose levels and more explicit end points.

The invention provides a multi color photoactive color changing ink, coating, plastic, or printed article comprising:
A) an organic polymer and
B) from about 2 to about 75 weight %, for example, from about 3 to about 60 weight %, based on the total weight of components A and B, of a multi color photoactive color changing composition comprising
  a) from 1 to 5 parts by weight of one or more photochromic material, such as an organic photochromic dye, for example, a spiropyran or spirooxazine photochromic dye,
  b) from 1 to 20 parts by weight of one or more phenolic photolatent acid such as a hindered phenol anti-oxidant, for example a tocopherol or tocotrienol, and
  c) from 1 to 10 parts by weight of one or more acid sensitive chromogenic color former of the formula

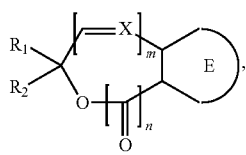

(I)

wherein
R$_1$ and R$_2$ independently of each other are C$_6$-C$_{14}$aryl or C$_5$-C$_{14}$heteroaryl, both of which optionally are substituted by one or more C$_1$-C$_{12}$alkyl, C$_1$-C$_{12}$alkoxy, C$_1$-C$_{12}$-dialkylamino, C$_1$-C$_{12}$alkylamino, C$_6$-C$_{14}$aryl, C$_6$-C$_{14}$arylamino, di(C$_1$-C$_{14}$aryl)amino or halogen; or
R$_1$ and R$_2$ together form a ring or ring system, optionally comprising one or more heteroatoms selected from the group consisting of O, S and N;
m and n are each an integer 0 or 1, provided that the sum n+m is 1 (typically n is 1 and m is 0);
X is CH or N; and
E denotes a C$_6$-C$_{14}$aryl or C$_5$-C$_{14}$heteroaryl ring or ring system, wherein the C$_6$-C$_{14}$aryl or C$_5$-C$_{14}$heteraryl ring or ring system optionally is substituted by one or more C$_1$-C$_{12}$alkyl, C$_1$-C$_{12}$alkoxy C$_1$-C$_{12}$alkylamino, C$_1$-C$_{12}$dialkylamino, NO$_2$, CN or halogen.

R$_1$ and R$_2$ as C$_6$-C$_{14}$aryl for example are phenyl or phenyl substituted by C$_1$-C$_{12}$alkyoxy, C$_1$-C$_{12}$dialkylamino, e.g. methoxy or dimethylamino. Typically, when such substitutents are present they are situated in the p-position of the phenyl ring.

R$_1$ and R$_2$ as C$_5$-C$_{14}$heteroaryl for example are indol or pyrazol, both optionally substituted by C$_1$-C$_{12}$alkyl, C$_1$-C$_{12}$alkoxy, C$_1$-C$_{12}$dialkylamino, C$_1$-C$_{12}$alkylamino and/or halogen.

When R$_1$ and R$_2$ together form a ring or ring system, optionally comprising heteroatoms, said heteroatoms for example are O, N or S, for example O and N, typically O.

For example, R$_1$ and R$_2$ together are

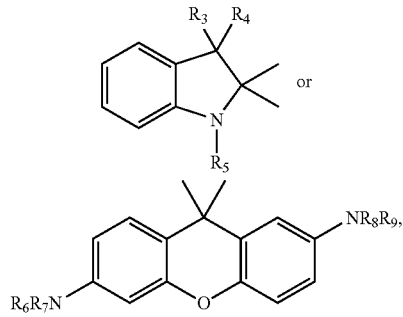

wherein R$_3$, R$_4$, R$_5$ are C$_1$-C$_{24}$alkyl, for example C$_1$-C$_8$alkyl; typically R$_3$ and R$_4$ are methyl or ethyl and R$_6$-R$_9$ are hydrogen, C$_1$-C$_{24}$alkyl, C$_6$-C$_{14}$aryl, such as phenyl, naphthyl or anthryl, for example phenyl, or phenyl-C$_1$-C$_6$alkyl, in particular benzyl. The substituents C$_6$-C$_{14}$aryl and phenyl-C$_1$-C$_3$alkyl at the phenyl rings optionally are substituted by one or more C$_1$-C$_{12}$alkyl, C$_1$-C$_{12}$alkoxy, hydroxyl and/or halogen.

Phenyl-C$_1$-C$_6$alkyl is for example benzyl, phenylethyl, α-methylbenzyl, phenylpentyl, phenylhexyl or α,α-dimethylbenzyl, frequently benzyl. Substituted phenyl-C$_1$-C$_5$alkyl is substituted one to four times, for example once, twice or three times, very often twice or three times, typically on the phenyl ring.

Halogen means fluoro, chloro, bromo, or iodo, for example, chloro.

C$_1$-C$_{24}$-Alkyl (as well as, for example C$_1$-C$_{20}$-, C$_1$-C$_{18}$-, C$_1$-C$_{14}$-, C$_1$-C$_{12}$-, C$_1$-C$_8$-, C$_1$-C$_6$- or C$_1$-C$_4$alkyl) is a branched or unbranched alkyl chain containing the that number of carbon atoms, which include for example, methyl, ethyl, n-, i-propyl, n-, sec.-, iso-, tert.-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, for example C$_1$-C$_8$-alkyl includes methyl, ethyl, n-, i-propyl, n-, sec.-, iso-, tert.-butyl, n-pentyl, n-hexyl, n-heptyl, n-octyl, particularly preferred $C_1$-$C_6$-alkyl such as methyl, ethyl, n-, i-propyl, n-, sec.-, iso-, tert.-butyl, n-pentyl, n-hexyl, and $C_1$-$C_4$-alkyl includes methyl, ethyl, n-, i-propyl, n-, sec.-, iso-, tert.-butyl.

$C_5$-$C_8$-Cycloalkyl stands for cyclopentyl, cyclohexyl, cycloheptyl, or cyclooctyl, most often cyclohexyl.

$C_2$-$C_{24}$-Alkenyl is a branched or unbranched alkyl chain containing the that number of carbon atoms which also contains one or more carbon/carbon double bonds and includes for example, ethenyl, n-, i-propenyl, n-, sec.-, iso-, tert.-butenyl, n-pentenyl, n-hexenyl, n-heptenyl, n-octenyl, n-nonenyl, n-decenyl, n-undecenyl, n-dodecenyl, n-tridecenyl, n-tetradecenyl, n-pentadecenyl, n-hexadecenyl, n-heptadecenyl, n-octadecenyl, n-nonadecenyl, n-eicosenyl.

Likewise, alkoxy, such as $C_1$-$C_{12}$-, $C_1$-$C_{10}$-, $C_1$-$C_8$-, $C_1$-$C_6$- or $C_1$-$C_4$-alkoxy is a branched or unbranched alkyl chain containing the specified number of carbons which are connected to the rest of the compounds through an oxygen atom and includes for example, methoxy, ethoxy, propoxy, isopropoxy, n-butyloxy, sec-butyloxy, iso-butyloxy, tert-butyloxy, pentyloxy, hexyloxy, heptyloxy, 2,4,4-trimethylpentyloxy, 2-ethylhexyloxy, octyloxy, nonyloxy, decyloxy or dodecyloxy, for example, methoxy, ethoxy, propoxy, isopropoxy, n-butyloxy, sec-butyloxy, iso-butyloxy, tert-butyloxy.

Heterocyclic residue or heterocyclic ring system means an optionally substituted monocyclic or bicyclic heterocyclic residue such as pyrrolidino, piperidino, morpholino, benzthiazole, 1,2,4-triazole, imidazole, pyrazole, tetrazole, thiazolin-2-thione, imidazolin-2-thione, N-methyl-imidazolon-2-thione and 5-(3-phenyl-1,3,4-thia-diazol-2(3H)-thione), 2-pyridine, 4-pyridine, 3-pyridazine, 2-pyrimidine, 2-thiazole, 2-thioazoline, 3-(1,2,4-triazole) and 5-(2-mercapto-1,3,4-thiadiazole), naphthyridine, purine and pteridine residues, benzimiazole, benzotriazole, benzoxazolin-2-thione, 2-benzoxazole, mercaptobenzoxazol, mercaptobenzthiazol and quinolinyl.

$C_5$-$C_{14}$Heteroaryl in the context of the present invention is an aromatic ring or ring system, comprising at least one heteroatom. The number 5-14 denotes the total number of ring atoms and includes both carbon and heteroatoms. Said heteroatoms are typically selected from the group consisting of O, S or/and N. Examples of heteroary include thienyl, benzo-[b]thienyl, naphtho[2,3-b]thienyl, thianthrenyl, dibenzofuryl, chromenyl, xanthenyl, thioxanthyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-Carbolinyl, phenanthridinyl, acridinyl, perimidinyl, phenanthrolinyl, phenazinyl, isothiazolyl, phenothiazinyl, isoxazolyl, furazanyl, terphenyl, fluorenyl, phenoxazinyl, 9,10-dioxo-9,10-dihydroanthracen-2-yl, 3-benzo[b]thienyl, 5-benzo[b]thienyl, 2-benzo[b]thienyl, 4-dibenzofuryl, 4,7-dibenzofuryl, 4-methyl-7-dibenzofuryl, 2-xanthenyl, 8-methyl-2-xanthenyl, 3-xanthenyl, 2-phenoxyathiinyl, 2,7-phenoxathiinyl, 2-pyrrolyl, 3-pyrrolyl, 5-methyl-3-pyrrolyl, 2-imidazolyl, 4-imidazolyl, 5-imidazolyl, 2-methyl-4-imidazolyl, 2-ethyl-4-imidazolyl, 2-ethyl-5-imidazolyl, 3-pyrazolyl, 1-methyl-3-pyrazolyl, 1-propyl-4-pyrazolyl, 2-pyrazinyl, 5,6-dimethyl-2-pyrazinyl, 2-indolizinyl, 2-methyl-3-isoindolyl, 2-methyl-1-isoindolyl, 1-methyl-2-indolyl, 1-methyl-3-indolyl, 1,5-dimethyl-2-indolyl, 1-methyl-3-indazolyl, 2,7-dimethyl-8-purinyl, 2-methoxy-7-methyl-8-purinyl, 2-quinolizinyl, 3-isoquinolyl, 6-isoquinolyl, 7-isoquinolyl, 3-methoxy-6-isoquinolyl, 2-quinolyl, 6-quinolyl, 7-quinolyl, 2-methoxy-3-quinolyl, 2-methoxy-6-quinolyl, 6-phthalazinyl, 7-phthalazinyl, 1-methoxy-6-phthalazinyl, 1,4-dimethoxy-6-phthalazinyl, 1,8-naphthyridin-2-yl, 2-quinoxalinyl, 6-quinoxalinyl, 2,3-dimethyl-6-quinoxalinyl, 2,3-dimethoxy-6-quinoxalinyl, 2-quinazolinyl, 7-quinazolinyl, 2-dimethylamino-6-quinazolinyl, 3-cinnolinyl, 6-cinnolinyl, 7-cinnolinyl, 3-methoxy-7-cinnolinyl, 2-pteridinyl, 6-pteridinyl, 7-pteridinyl, 6,7-dimethoxy-2-pteridinyl, 2-Carbazolyl, 3-carbazolyl, 9-methyl-2-carbazolyl, 9-methyl-3-carbazolyl, β-carbolin-3-yl, 1-methyl-β-carbolin-3-yl, 1-methyl-β-Carbolin-6-yl, 3-phenanthridinyl, 2-acridinyl, 3-acridinyl, 2-perimidinyl, 1-methyl-5-perimidinyl, 5-phenanthrolinyl, 6-phenanthrolinyl, 1-phenazinyl, 2-phenazinyl, 3-isothiazolyl, 4-isothiazolyl, 5-isothiazolyl, 2-phenothiazinyl, 3-phenothiazinyl, 10-methyl-3-phenothiazinyl, 3-isoxazolyl, 4-isoxazolyl, 5-isoxazolyl, 4-methyl-3-furazanyl, 2-phenoxazinyl and 10-methyl-2-phenoxazinyl.

$C_1$-$C_{12}$Dialkylamino denotes $(C_1$-$C_{12}alkyl)_2N$—, $C_1$-$C_{12}$alkylamino is $(C_1$-$C_{12}alkyl)$-NH—, wherein the $C_1$-$C_{12}$alkyl is defined as above.

The term "ring system" refers to a number of carbocyclic or heterocyclic rings, which are condensed, said rings being similar or different, for example:

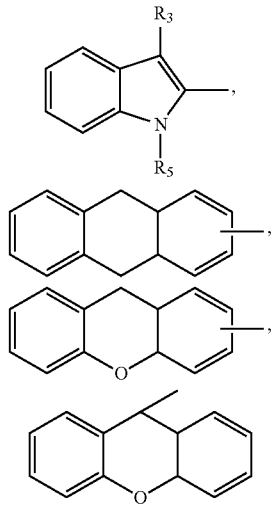

etc.

For example, the chromogenic color former is of the following formulae:

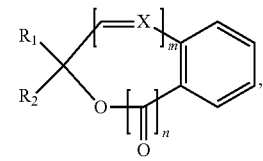

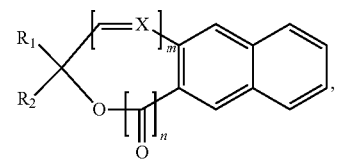

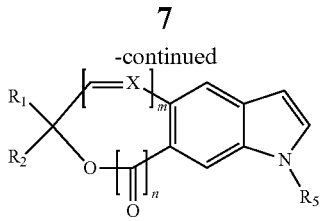

etc, for example:

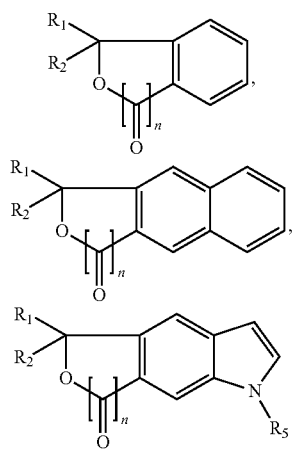

etc.

It is obvious that color formers wherein the structures as shown above are modified by specific substituents or annulated rings are also suitable in the context of the present invention.

For example, the compound of formula I is a compound of the formula

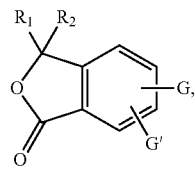

wherein
G and G' are independently H, $C_1$-$C_{12}$alkyl, $C_1$-$C_{12}$alkoxy $C_1$-$C_{12}$alkylamino, $C_1$-$C_{12}$dialkylamino, $NO_2$, CN or halogen,
$R_1$ and $R_2$ are selected from phenyl, phenyl substituted by $C_1$-$C_{12}$alkyoxy, phenyl substituted by $C_1$-$C_{12}$dialkylamino, indole, indole substituted by $C_1$-$C_{12}$alkyl, $C_1$-$C_{12}$alkoxy, $C_1$-$C_{12}$dialkylamino, and/or halogen, pyrazol and pyrazol substituted by $C_1$-$C_{12}$alkyl, $C_1$-$C_{12}$alkoxy, $C_1$-$C_{12}$alkylamino and/or halogen,
or $R_1$ and $R_2$ together form a ring or ring system selected from

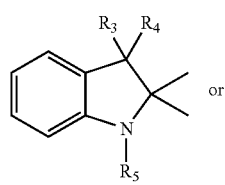

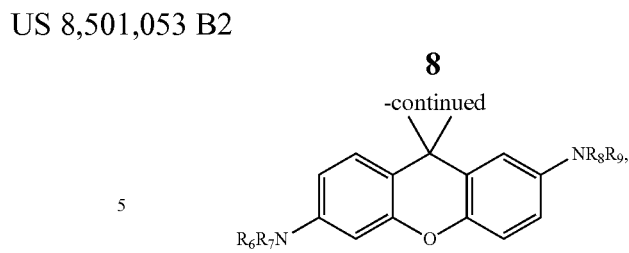

wherein $R_3$, $R_4$, $R_5$ are $C_1$-$C_{24}$alkyl, for example $C_1$-$C_8$alkyl, typically $R_3$ and $R_4$ are methyl or ethyl, and $R_6$-$R_9$ are hydrogen, $C_1$-$C_{24}$alkyl, $C_6$-$C_{14}$aryl, such as phenyl, naphthyl or anthryl, or phenyl-$C_1$-$C_6$alkyl, in particular benzyl, wherein the aromatic rings of the $C_6$-$C_{14}$aryl and phenyl-$C_1$-$C_3$alkyl substituents are optionally substituted by one or more $C_1$-$C_{12}$alkyl, $C_1$-$C_{12}$alkoxy, hydroxyl and/or halogen.

Frequently, the color former is of the following formulae, wherein R is hydrogen or $C_1$-$C_{12}$-alkyl:

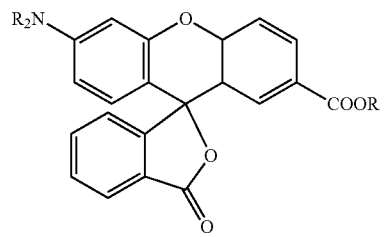

Amino Fluoran

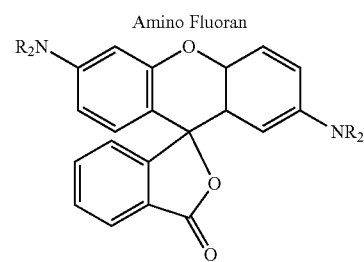

Diamino Fluoran

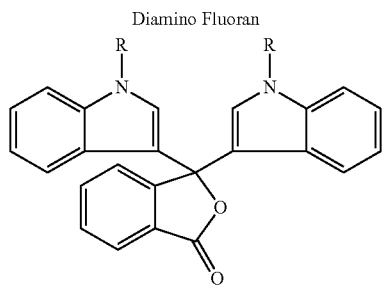

Bisindolyl Phthalide

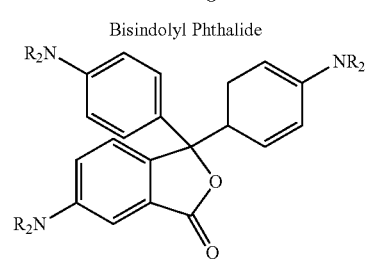

Aminophenyl Phthalide

The photolatent acid b of the invention comprises a phenol, generally a hindered phenol such as a hindered phenol antioxidant. A hindered phenol is a phenol compound which bears a non-hydrogen substituent, typically an alkyl group, adjacent to the phenolic hydroxy. For example, hindered phenol antioxidants are described in US Published Patent Appl.

No. 2007/0050927, pages 6-11 which is incorporated herein by reference and include compounds of the following classes:

Alkylated monophenols, alkylthiomethylphenols, hydroquinones, alkylated hydroquinones, tocopherols, alkylidenebisphenols, hydroxybenzylated malonates, aromatic hydroxybenzyl compounds, esters of β-(3,5-di-tert-butyl-4-hydroxyphenyl)propionic acid, β-(5-tert-butyl-4-hydroxy-3-methylphenyl)propionic acid, esters of β-(3,5-dicyclohexyl-4-hydroxyphenyl)-propionic acid, or esters of 3,5-di-tert-butyl-4-hydroxyphenyl acetic acid, and amides of β-(3,5-di-tert-butyl-4-hydroxyphenyl)propionic acid.

For example, a hindered phenol antioxidant useful as a photo sensitizer in the present composition can be selected from selected from:

- alkylated monophenols, which include, for example, 2,6-di-tert-butyl-4-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-dinonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)-phenol and mixtures thereof;
- hydroquinones and alkylated hydroquinones which include, for example, 2,6-di-tert-butyl-4-methoxyphenol, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate;
- alkylidenebisphenols which include, for example, 2,2'-methylenebis(6-tert-butyl-4-methylphenol), 2,2'-methylenebis(6-tert-butyl-4-ethylphenol), 2,2'-methylenebis-[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylene-bis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3'-tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane;
- benzyl compounds which include, for example, 3,5,3',5'-tetra-tert-butyl-4,4'-dihydroxydibenzyl ether;
- hydroxybenzylated malonates which include, for example, dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)-malonate, bis[4-(1,1,3,3-tetramethylbutyl)phenyl]-2,2-bis(3,5-di-tert-butyl-4-hydroxybenzyl)malonate;
- aromatic hydroxybenzyl compounds which include, for example, 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;
- hydroxybenzylated malonates which include, for example, dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)-malonate, bis[4-(1,1,3,3-tetramethylbutyl)phenyl]-2,2-bis(3,5-di-tert-butyl-4-hydroxybenzyl)malonate;
- benzylphosphonates which include, for example, dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid;
- acylaminophenols include, for example, 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate;
- esters of β-(3,5-di-tert-butyl-4-hydroxyphenyl)propionic acid include, for example, ester with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;
- esters of β-(5-tert-butyl-4-hydroxy-3-methylphenyl)propionic acid which include, for example, esters with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;
- esters of β-(3,5-dicyclohexyl-4-hydroxyphenyl)propionic acid which include, for example, esters with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol; and
- esters of 3,5-di-tert-butyl-4-hydroxyphenyl acetic acid which include, for example, esters with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol.

Particular examples are compounds selected from 2,6-di-tert-butyl-4-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol, 2,2'-methylenebis(6-tert-butyl-4-methylphenol), 2,2'-methylenebis(6-tert-butyl-4-ethylphenol), 2,2'-methylenebis-[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis-(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, ethylene glycol bis[3,3-bis(3-tert-butyl-4-hydroxyphenyl)butyrate], bis[2-(3'tert-butyl-2-hydroxy-5-methylbenzyl)-6-tert-butyl-4-methylphenyl]-terephthalate, 1,1-bis-(3,5-dimethyl-2-hydroxyphenyl)butane, 2,2-bis-(3,5-di-tert-butyl-4-hydroxyphenyl)propane and esters of β-(3,5-di-tert-butyl-4-hydroxyphenyl)propionic acid, β-(5-tert-butyl-4-hydroxy-3-methylphenyl)propionic acid or 3,5-di-tert-butyl-4-hydroxyphenyl acetic acid with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, trimethylhexanediol or trimethylolpropane.

The phenol is often a compound of the formula

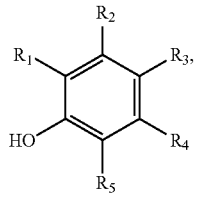

wherein
$R_1$, $R_2$, $R_3$, $R_4$ and $R_5$ are independently of each other hydrogen, O—R, O—CO—R, COOR, $C_1$-$C_{24}$-alkyl, $C_2$-$C_{24}$-alkenyl, aryl, for example phenyl or phenyl substituted one to three times with $C_1$-$C_8$alkyl, which alkyl or alkenyl may be interrupted one or more times by one or more carbonyl, carbonyl oxy or oxygen atom and which alkyl, alkenyl, interrupted alkyl, interrupted alkenyl or aryl may be substituted one or more time by one or more $C_1$-$C_8$ alkyl, halogen, O—R, O—CO—R, (CO)R, COOR, or any two of adjacent $R_1$, $R_2$, $R_3$, $R_4$ and $R_5$ can form a 5 or 6 membered carbocyclic or heterocyclic ring which carbocyclic or heterocyclic ring can be substituted one or more times by one or more, O—R, O—CO—R, COOR, $C_1$-$C_{24}$-alkyl, $C_2$-$C_{24}$-alkenyl, aryl, wherein R is hydrogen, $C_1$-$C_{24}$-alkyl, $C_2$-$C_{24}$-alkenyl, aryl, for example phenyl or phenyl substituted one to three times with $C_1$-$C_8$alkyl, or $C_1$-$C_{24}$-alkyl or $C_2$-$C_{24}$-alkenyl which are interrupted one or more times by carbonyl, carbonyloxy or oxygen atom and/or substituted one or more time by one or more halogen, hydroxyl, $C_1$-$C_8$ alkoxy, $C_1$-$C_8$ alkoxycarbonyl, or $C_1$-$C_8$ carbonylalkoxy.

Typically at least one of $R_1$ and $R_5$ are other than hydrogen, for example methyl, dodecyl or t-butyl.

For example, $R_1$ is $C_1$-$C_8$-alkyl,
$R_2$, $R_3$, $R_4$ and $R_5$ are independently of each other hydrogen, O—R, $C_1$-$C_{24}$-alkyl, which alkyl may be interrupted one or more times by one or more oxygen atom and/or substituted one or more time by one or more halogen, O—R, O—CO—R, (CO)R, COOR,
or any two of adjacent $R_2$, $R_3$, $R_4$ and $R_5$ can form a 5 or 6 membered carbocyclic or heterocyclic ring which carbocyclic or heterocyclic ring can be substituted one or more times by one or more, O—R, O—CO—R, COOR, $C_1$-$C_{24}$-alkyl, wherein R is hydrogen, $C_1$-$C_{24}$-alkyl, $C_2$-$C_{24}$-alkenyl, or $C_1$-$C_{24}$-alkyl or $C_2$-$C_{24}$-alkenyl interrupted one or more times by oxygen atom and/or substituted one or more time by one or more halogen, hydroxyl, $C_1$-$C_8$ alkoxy, $C_1$-$C_8$ alkoxycarbonyl, or $C_1$-$C_8$ carbonylalkoxy.

In one particular embodiment, the photolatent acid of the invention is a tocopherol, for example α-tocopherol, β-tocopherol, γ-tocopherol, δ-tocopherol and mixtures thereof such as in Vitamin E.

Phenols are used as the photolatent acid in part because they are not as sensitive as many other photo sensitive activators either because they are relatively weakly UV absorbing or because even when exposed to UV the acids formed are not particularly strong or, in the case of hindered phenols, not kinetically accessible. This offers an additional advantage when preparing dosimeters that are used to monitor longer term or low intensity UV exposures in that formulations can be readily prepared which change color over a longer period of time. By adjusting the amount of phenolic activator one can control the UV dose required for any predetermined color change allowing one to prepare a system wherein the photochromic material can form color and then significantly fade before discernable color formation from the chromogenic system is clearly discernable.

Other photo latent acids include carboxylic acids such as benzoic acid derivatives, vitamin C etc. When using the phenolic or carboxylic acid photo sensitive activators of the invention, other photoinitiator compounds are not needed and are typically excluded.

It has been found however, that the rate of color change due to the chromogenic system can also be effected by the addition of photosensitizers or energy transfer agents. Many such compounds are known and commercially available and include, for example, thioxanthones and benzophenones. In one example, the rate of color change was siginifically increased by the addition of isopropylthioxanthone to a chromigenic system comprising an aminophenyl phthalide color former and vitamin E as photolatent acid.

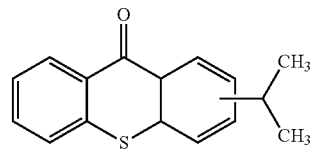

isopropylthioxanthone (ITX)

The combination of components b and c, plus any optional photosensitizer or energy transfer agent, represents the photo active chromogenic system comprised by the invention.

The photochromic material (a) typically comprises an organic photochromic dye, for example a spiropyran or spirooxazine photochromic dye, as described for example in Published U.S. Pat. No. Appl 2007/0172951, the disclosure of which is herein incorporated by reference, for example, a dye of the formulae:

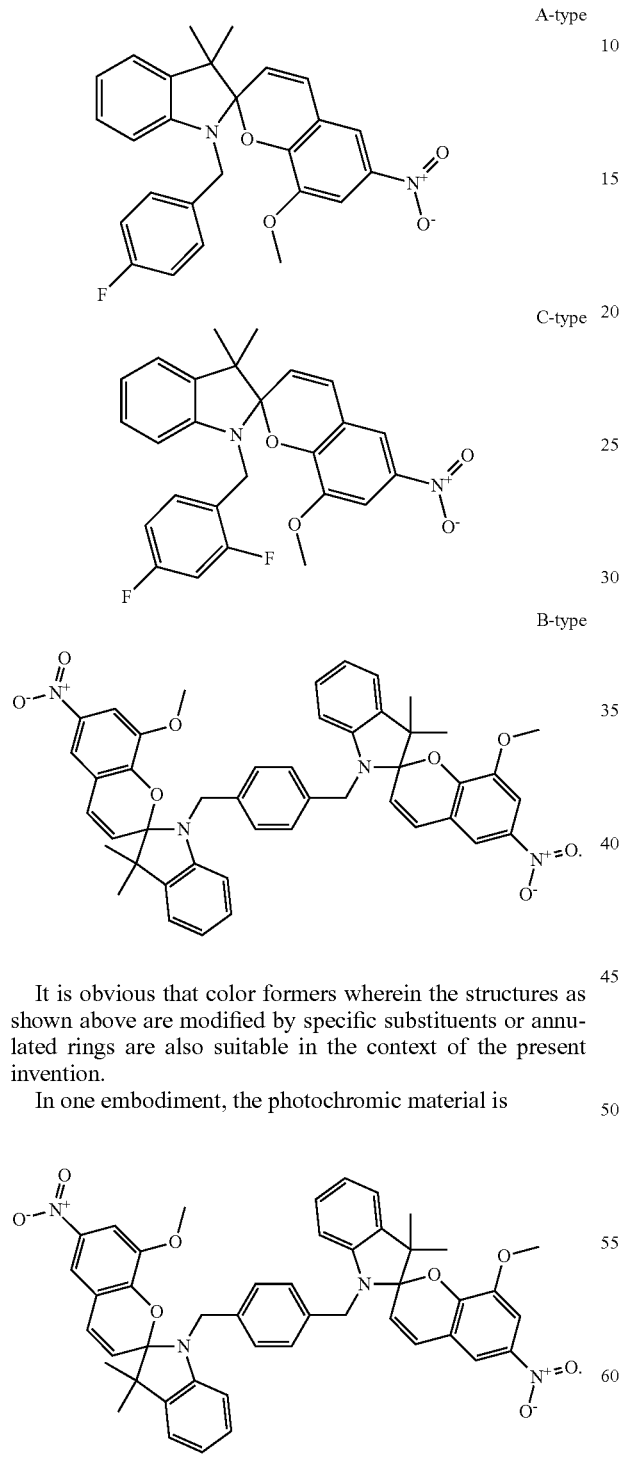

It is obvious that color formers wherein the structures as shown above are modified by specific substituents or annulated rings are also suitable in the context of the present invention.

In one embodiment, the photochromic material is

More than one photochromic dye, chromogenic color former or photolatent acid may be present in the inventive composition.

Other colorants such as organic dyes or pigments and inorganic pigments may also be present in the color changing ink, coating, plastic, or printed article provided that they not completely mask the color changes of the inventive composition when exposed to UV.

Other colorants such as organic dyes or pigments and inorganic pigments may also be present in a substrate which is coated, printed upon or laminated with an ink, coating or plastic film comprising the inventive color changing composition. In one embodiment of the invention, a dosimeter is provided wherein the ink of the invention is printed in a specific pattern on a substrate which already contains a pattern of color representing the color that the inventive ink becomes after a specific dose of radiation.

The materials of the present color changing compositions are all known and can be prepared by conventional means as found in the literature, e. g. GB 2,120,243 and EP-A-0 330 613. Many of the components are commercially available.

For example, in one particular embodiment, the multi color photoactive color changing composition of the invention comprises the following commercially available materials:
1) as the photochromic material, the B-type dye from above,
2) as the photolatent acid, the mixture of tocopherols present in Vitamin E, and
3) as the acid sensitive chromogenic color former a compound of the formula

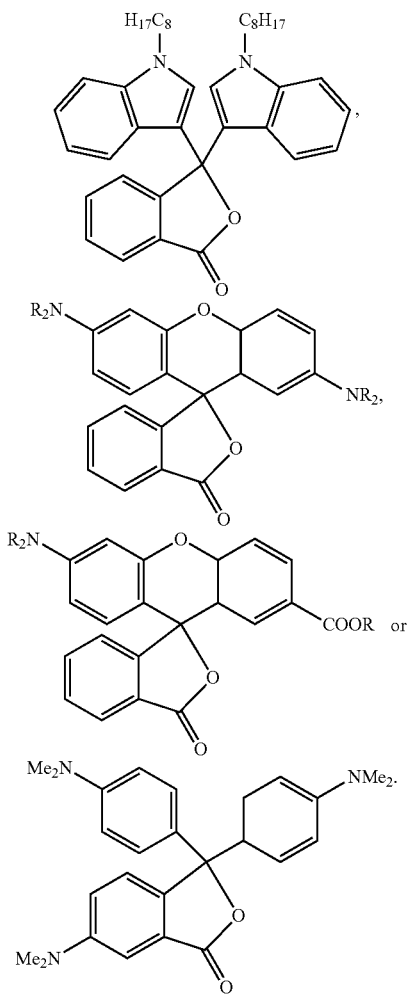

Depending on the desired response to UV dose, i.e., the rates of color change due to UV exposure, the three components of the composition can be present in nearly any ratio. Generally however, the weight ratio of color former component c to photolatent acid component b ranges from about 1:10 to about 5:1, for example from about 1:4 to about 2:1, or from about 1:2 to 1:1; for example, 2:1, 1:1, 1:1.2, 1:1.5 and 1:2. The ratio of color former to photolatent acid impacts the rate of color development from the chromogenic system, higher amounts of latent acid typically generate color faster leading to full chromogenic color development at lower dose levels of UV.

In certain circumstances, the addition of a photosensitizer or energy transfer agent will increase the rate of color formation more the addition more phenol. When employing a photosensitizer or energy transfer agent, such as isopropylthioxanthone, the amount of photosensitizer or energy transfer agent need not be very large and typically is less than the amount of phenol.

In one embodiment of the invention, the photochromic material of component a is chosen to change from clear to a specific color rapidly upon exposure to UV light, in particular to the UV light present in sun light, and then fade over continued exposure, for example complete color formation and fading takes between 10 and 120 minutes, for example from about 15 to about 60 minutes. The photolatent acid and chromogenic color former are chosen to form color much more slowly, for example, from about 20 to about 300 minutes of exposure to, for example, the UV light present in sunlight, before full color development occurs, for example, from about 30 to about 240 minutes, or from about 30 minutes to about 150 minutes.

Of course, the components of the color changing composition need not be initially colorless, as long as they can change from one color to another as required.

In one particular embodiment, an ink is prepared containing, along with a binder and the components a, b and c of the inventive composition, a pigment. For example, applying to a substrate an ink comprising both a color changing composition as described above, which changes from colorless to blue to magenta, and a yellow pigment, provides a coated substrate which is originally yellow, rapidly turns green upon exposure to sunlight as the photochromic material turns blue, then becomes red as the blue color fades and the chromogenic magenta color is formed.

For example, in the above ink, an organic yellow pigment, such as Pigment Yellow 13 may be used, or an inorganic pigment, such as a bismuth vanadate pigment may be used along with the color changing composition.

The ink, coating or plastic comprising an organic polymer and the multi color photoactive color changing composition comprises from about 25% to about 98% of organic polymer, for example, from about 40% to about 97% polymer, for example, from about 50% to about 95% polymer.

Organic polymers include naturally occurring organic polymers and synthetic organic polymers. Naturally occurring organic polymers include, for example, cotton, viscose, flax, rayon, linen, wool, cashmere, angora, silk, cellulose, natural rubber, gelatin, or polymer-homologously chemically modified derivatives thereof, such as cellulose acetates, propionates and butyrates, the cellulose ethers such as methyl cellulose and also colophonium resins and derivatives.

Synthetic organic polymers include thermoplastic, thermoset, elastomeric, or crosslinked polymers. For example, the color changing composition is readily incorporated into plastic articles, coatings and inks comprising polymeric binders and the like.

Examples of thermoplastic, thermoset, elastomeric, inherently crosslinked or crosslinked polymers are well known and are described for example in U.S. Pat. No. 7,294,287, which is incorporated herein in its entirety by reference. Examples are listed below:

1. Polymers of mono- and di-olefins, for example polypropylene, polyisobutylene, polybutene-1, poly-4-methylpentene-1, polyisoprene or polybutadiene and also polymerisates of cyclo-olefins, for example of cyclopentene or norbornene; and also polyethylene (which may optionally be crosslinked), for example high density polyethylene (HDPE), high density polyethylene of high molecular weight (HDPE-HMW), high density polyethylene of ultra-high molecular weight (HDPE-UHMW), medium density polyethylene (MDPE), low density polyethylene (LDPE), and linear low density polyethylene (LLDPE), (VLDPE) and (ULDPE).

Polyolefins, that is to say polymers of mono-olefins, as mentioned by way of example in the preceding paragraph, especially polyethylene and polypropylene, can be prepared by various processes, especially by the following methods:
a) by free radical polymerisation (usually at high pressure and high temperature);
b) by means of a catalyst, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either π- or σ-Coordinated. Such metal complexes may be free or fixed to carriers, for example to activated magnesium chloride, titanium(III) chloride, aluminium oxide or silicon oxide. Such catalysts may be soluble or insoluble in the polymerisation medium. The catalysts can be active as such in the polymerisation or further activators may be used, for example metal alkyls, metal hydrides, metal alkyl halides, metal alkyl oxides or metal alkyl oxanes, the metals being elements of group(s) Ia, IIa and/or IIIa. The activators may have been modified, for example, with further ester, ether, amine or silyl ether groups.

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, for example ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-Carbon monoxide copolymers and mixtures thereof with other polymers, for example polyamides.

4. Hydrocarbon resins (for example $C_5$-$C_9$) including hydrogenated modifications thereof (for example tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/-alkyl acrylate and methacrylate, styrene/maleic anhydride, styrene/acrylonitrile/methyl acrylate; high-impact-strength mixtures consisting of styrene copolymers and another polymer, for example a polyacrylate, a diene polymer or an ethylene/propylene/diene terpolymer; and also block copolymers of styrene, for example styrene/butadiene/styrene, styrene/isoprene/styrene, styrene/ethylene-butylene/styrene or styrene/ethylene-propylene/styrene.

7. Graft copolymers of styrene or α-methylstyrene, for example styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-Called ABS, MBS, ASA or AES polymers.

8. Halogen-Containing polymers, for example polychloroprene, chlorinated rubber, chlorinated and brominated copolymer of isobutylene/isoprene (halobutyl rubber), chlorinated or chlorosulfonated polyethylene, copolymers of ethylene and chlorinated ethylene, epichlorohydrin homo- and co-polymers, especially polymers of halogen-Containing vinyl compounds, for example polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from α,β-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, polyethylene oxide, polypropylene oxide or copolymers thereof with bisglycidyl ethers.

13. Polyacetals, such as polyoxymethylene, and also those polyoxymethylenes which contain comonomers, for example ethylene oxide; polyacetals modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxyl groups on the one hand and aliphatic or aromatic polyisocyanates on the other hand, and their initial products.

16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamides prepared from hexamethylenediamine and iso- and/or tere-phthalic acid and optionally an elastomer as modifier, for example poly-2,4,4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamide imides, polyether imides, polyester imides, polyhydantoins and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from polyethers with hydroxyl terminal groups; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol-formaldehyde, urea-formaldehyde and melamine-formaldehyde resins.

22. Drying and non-drying alkyd resins.

23. Unsaturated polyester resins derived from copolyesters of saturated and unsaturated dicarboxylic acids with polyhydric alcohols, and also vinyl compounds as crosslinking agents, and also the halogen-Containing, difficultly combustible modifications thereof.

24. Crosslinkable acrylic resins derived from substituted acrylic esters, e.g. from epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of bisphenol-A diglycidyl ethers, bisphenol-F diglycidyl ethers, that are crosslinked using customary hardeners, e.g. anhydrides or amines with or without accelerators.

27. Natural polymers, such as cellulose, natural rubber, gelatin, or polymer-homologously chemically modified derivatives thereof, such as cellulose acetates, propionates and butyrates, and the cellulose ethers, such as methyl cellulose; and also colophonium resins and derivatives.

28. Mixtures (polyblends) of the afore-mentioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The thermoplastic, crosslinked or inherently crosslinked polymer is, for example, a polyolefin, polyamide, polyurethane, polyacrylate, polyacrylamide, polyvinyl alcohol, polycarbonate, polystyrene, polyester, polyacetal or a halogenated vinyl polymer such as PVC.

The polymeric compositions may be, for example, in the form of films, injection-moulded articles, extruded workpieces, fibres, sheets, felts or woven fabrics; they may also be coating formulations, such as decorative or protective coatings, paints, laminates, inks etc. The coating composition or formulation of the present invention can be applied to almost any organic or inorganic substrate such as metal, wood, plastic articles, other coating layers, paper, textile fabrics, etc.

The polymeric compositions may also comprise other optional components such as antioxidants, UV absorbers, hindered amines, phosphites or phosphonites, benzofuran-2-ones, thiosynergists, polyamide stabilizers, metal stearates, nucleating agents, fillers, reinforcing agents, lubricants, emulsifiers, dyes, pigments, dispersants, other optical brighteners, flame retardants, antistatic agents, blowing agents, leveling agents and the like, or mixtures thereof.

When the color changing composition of the present invention is comprised by a coating formulation, and in the context of the present invention an ink can be viewed as a type of a coating, a binder polymer is typically present. Binder polymers are typically film forming polymers which are well known, common items of commerce and can be found for example in co pending U.S. application Ser. No. 11/978,764, the relevant portions of which are incorporated herein by reference.

Typical binder polymers are also found, for example, in Ullmann's Encyclopedia of Industrial Chemistry, 5th Edition, Vol. A18, pp. 368-426, VCH, Weinheim 1991. In general, it is a film-forming binder based on a thermoplastic or thermosetting resin, predominantly on a thermosetting resin. Examples thereof are alkyd, acrylic, acrylamide, polyester, styrenic, phenolic, melamine, epoxy, polyvinyl alcohols, polyvinyl acetates, and polyurethane resins. For example, non-limiting examples of common coating binders useful in the present invention include silicon containing polymers, fluorinated polymers, unsaturated and saturated polyesters, unsaturated and saturated polyamides, polyimides, crosslinkable acrylic resins derived from substituted acrylic esters, e.g. from epoxy acrylates, urethane acrylates, polyester acrylates, polymers of vinyl acetate, vinyl alcohol and vinyl amine. The binder polymers may be co-polymers, polymer blends or composites.

The binder may be a surface coating resin which dries in the air or hardens at room temperature. Exemplary of such binders are nitrocellulose, polyvinyl acetate, polyvinyl chloride, unsaturated polyester resins, polyacrylates, polyurethanes, epoxy resins, phenolic resins, and alkyd resins. The binder may also be a mixture of different surface coating resins and may be used together with a hardener and/or accelerator. The binder can be a cold-curable or hot-curable binder; the addition of a curing catalyst may be advantageous. Suitable catalysts which accelerate curing of the binder are described, for example, in Ullmann's Encyclopedia of Industrial Chemistry, Vol. A18, p. 469, VCH Verlagsgesellschaft, Weinheim 1991.

Binder polymers may be crosslinked and the coating compositions may therefore contain common crosslinking agents and catalysts provided that they do not interact in an undesirable way with any of the components of the color changing composition.

Examples of coating compositions containing specific binders are:

1. coatings based on cold- or hot-crosslinkable alkyd, acrylate, polyester, polyether, epoxy, carbamate or melamine resins or mixtures of such resins,
2. two-component polyurethane coatings based on hydroxyl-containing acrylate, polyester or polyether resins and aliphatic or aromatic isocyanates, isocyanurates or polyisocyanates;
3. one-component polyurethane coatings based on blocked isocyanates, isocyanurates or polyisocyanates which are deblocked during baking, if desired with addition of a melamine resin;
4. one-component polyurethane coatings based on a tris-alkoxycarbonyltriazine crosslinker and a hydroxyl group containing resin such as acrylate, polyester or polyether resins;
5. one-component polyurethane coatings based on aliphatic or aromatic urethane-acrylates or polyurethaneacrylates having free amino groups within the urethane structure and melamine resins or polyether resins, if necessary with curing catalyst;
6. two-component coatings based on (poly)ketimines and aliphatic or aromatic isocyanates, isocyanurates or polyisocyanates;
7. two-component coatings based on (poly)ketimines and an unsaturated acrylate resin or a polyacetoacetate resin or a methacrylamidoglycolate methyl ester;
8. two-component coatings based on carboxyl- or amino-containing polyacrylates and polyepoxides;
9. two-component coatings based on acrylate resins containing anhydride groups and on a polyhydroxy or polyamino component;
10. two-component coatings based on acrylate-containing anhydrides and polyepoxides;
11. two-component coatings based on (poly)oxazolines and acrylate resins containing anhydride groups, or unsaturated acrylate resins, or aliphatic or aromatic isocyanates, isocyanurates or polyisocyanates;
12. two-component coatings based on unsaturated polyacrylates and polymalonates;
13. thermoplastic polyacrylate coatings based on thermoplastic acrylate resins or externally crosslinking acrylate resins in combination with etherified melamine resins;
14. paint systems based on siloxane-modified or fluorine-modified acrylate resins; and
15. polyacrylamides and polyacrylates.

The coating composition can also comprise further components specific to coating applications as found in Ullmann's Encyclopedia of Industrial Chemistry, 5th Edition, Vol. A18, pp. 429-471, VCH, Weinheim 1991.

The coating compositions can comprise a solvent, i.e., water, an organic solvent or solvent mixture, in which the binder is soluble or dispersed. The coating composition may be a high-solids formulation or can be solvent-free (e.g. a powder coating material). Powder coatings are, for example, those described in Ullmann's Encyclopedia of Industrial Chemistry, 5th Ed., A18, pages 438-444. The powder coating material may also have the form of a powder-slurry (dispersion of the powder preferably in water).

Concentrations are based on the solids content of the coatings formulations, that is the weight of the dried or cured coating film.

In one embodiment, the binder polymer is part of water born coating, that is a polymer that is water soluble or present in water as a latex or dispersion. For example, a polyacrylate, polyacrylamide, polyester, polyvinyl alcohol or polyvinyl acetate solution, latex or dispersion, for example, a polyacrylate, polyacrylamide or polyester solution, latex or dispersion, for example, a polyacrylate solution or dispersion.

U.S. Pat. No. 5,296,275, incorporated herein in its entirety by reference, discloses an ink formulation containing a photoactive chromogenic system which can be modified to suit the needs of the present invention. Related formulations are also disclosed in U.S. Pat. No. 4,920,091 and U.S. Pat. No. 5,486,901, which are also incorporated herein by reference.

Also provided is a method for preparing an UV dosimeter which method comprises forming a polymeric film adhered to a substrate, which film comprises a thermoplastic, elastomeric or thermoset polymer, which polymer may be crosslinked, and the multi color photoactive color changing composition of the invention. For example, in one embodiment, an UV dosimeter is prepared by forming a coating or ink formulation comprising a binder polymer and the multi color, photoactive, color changing composition and applying the coating or ink to a substrate, wherein the applied ink or coating will change upon exposure to afternoon sun, for example, from colorless (0 min) to for example blue in about 15-30 min then to red in about 90-150 min.

Typically, the UV dosimeter of the invention is used to alert people to the amount of UV light from the sun that has impacted their skin. In this embodiment the activating light source leading to color change is obviously the sun.

However, as referenced above, UV light is used in many commercial and industrial processes for which a convenient measure of UV dose is desired. Artificial light sources are typically used in such circumstances, for example, carbon arc lamps, xenon arc lamps, low-, medium-, high- and super high-pressure mercury lamps, possibly with metal halide dopes (metal-halogen lamps), microwave-stimulated metal vapor lamps, excimer lamps, superactinic fluorescent tubes, fluorescent lamps, argon incandescent lamps, electronic flashlights, light-emitting diodes (LED), e.g. UV light emitting diodes (UV-LED), photographic flood lamps and excimer lasers, such as $F_2$ excimer lasers at 157 nm exposure, KrF excimer lasers for exposure at 248 nm and ArF excimer lasers for exposure at 193 nm. In various embodiments of the invention therefore, the activating light source leading to color change can be any known artificial source of UV radiation.

The multi color, photoactive, color changing composition of the present invention is prepared by any common blending or mixing technique and the components can be added in any order. Likewise, the polymer compositions comprising the color changing composition are prepared using any common polymer processing method.

For example, the components of the color changing composition may be added as individual components or as a mixture during blending, for example, dry blending of a polymer resin prior to prior to processing, or any or all of the components of the color changing composition may be added as a blend, master batch, flush, or other concentrate in another substance prior to processing. The compounds may also be added during processing steps. Standard process steps for polymer resins are well known in the literature and include extrusion, coextrusion, Brabender melt processing, film formation, injection molding, blow molding, other molding and sheet forming processes, fiber formation etc.

The color changing composition may be dry blended or dissolved or dispersed in a solvent or solvents which is blended with a polymer resin. In one embodiment, water or an aqueous mixture is the solvent.

The color changing composition is readily incorporated into a coating or ink using techniques commonly practiced in coatings technology, for example, the color changing composition, the polymer resin and other optional components are dissolved or dispersed in an appropriate solvent or other carrier vehicle. The coating is then applied to the appropriate substrate by, for example, spraying, spin coating, drop coating, drawdown, brushing, dipping or any other standard coating application technique. Ink jet or other printing techniques are very useful in applying the composition of the invention. The coating formulation may also be applied in the form of a slurry or powder.

Drying or curing the coating formulation after can be accomplished by any standard means appropriate to the formulation components, for example, simply allowing the applied formulation sit at room temperature under standard environmental conditions, heating may be applied, reduced pressure may be used.

More than one polymer resin may be present in the polymer compositions of the invention.

Other interesting color formers are disclosed for example in U.S. Pat. No. 7,091,257, which is incorporated herein by reference. The color formers may be used as single compounds or in combination with each other or with further color forming compounds.

Inks of the invention can be prepared using any printing ink formulations. Some examples of binder or carrier resin in the ink are vinyl acetate, polyvinyl chloride, poly esters, poly vinyl alcohol, polyolefins, etc. Plastic media useful in the invention include, for example, high density polyethylene, low density polyethylene, polypropylene, polyvinyl chloride, polyesters, polyamide etc.

One particular embodiment of the present invention is a dual color sun protection indicator or dosimeter comprising the combination of spiropyran or spirooxazine photochromic dye, acid sensitive color former, and phenolic latent acid of the present color changing composition. Three color dosimeters, four color dosimeters etc are also available using variations of the instant compositions. In a dual color dosimeter, color from the photochromic dye develops immediately upon exposure to sunlight or other UV source, then fades, for example over about 15-60 minutes, and a second color develops from the color former/phenolic latent acid over 30-150 minutes, for example, 60-150 minutes. The colors and the specific times for color formation or fade depend on the exact systems chosen.

One embodiment of the invention provides a dosimeter prepared from a coating composition, such as and ink, which coating composition also contains an organic or inorganic pigment, which coating is applied to a suitable substrate such as a polymeric substrate, for example, a polyester.

Common antioxidants are quite useful as the photo latent acid, e.g., commercial hindered phenolic antioxidants like Irganox® 1010, Irganox® 245, Irganox® E 201, Santowhite® Powder, etc., which may contain vitamin E. Also useful are, e.g., benzoic acid derivatives, vitamin C etc.

The photochromic dye and the color former with photo latent acid can be in one layer or two different layers. Layers in this case can be, for example, to different thermoplastic films comprising different color changing components, two different substrates coated or printed with compositions comprising different color changing components, or two different coating or ink layers applied on top of each other each comprising different color changing components.

If a photochromic dye containing layer is over a layer containing the chromogenic color former/activator, the color from the photochromic will appear and fade, but the color from the chromogenic layer will not typically be seen due to the photochromic material absorbing and thus preventing the UV light necessary to activate the photolatent acid from reaching the bottom layer containing color former/activator. When a layer containing color former/activator layer is over a photochromic dye, the two layer system typically still develops the photochromic dye color first which fades and leads and is replaced by the chromogenic component color. The overall color pattern is thus similar to a one coat system containing all the components. Apparently, the less active photolatent acids of the invention do not screen as much UV light.

The dosimeter of the invention is conveniently prepared using an ink comprising the color changing composition. Typically the ink will contain a carrier resin and from 1% to 15%, preferably from 2% to 8% of a photochromic dye, from 1% to 30%, preferably from 4% to 10% of a hindered phenol and from 1% to 15%, preferably from 2% to 8% of a acid sensitive chromogenic color, based on resin solids. The ratio of chromogenic color former to hindered phenol is from about 1:10 to about 2:1, typically from 1:4 to 1:1.

For example, a dosimeter of the invention is prepared by printing using conventional printing processes a colorless ink containing 2% Ciba® TTI LF 3155 dye, 8% Pergascript® Red and 10% Vitamin E onto a PET sheet. Alternately, the "ink" can be applied as a coating using simple drawdown, spray or other common techniques.

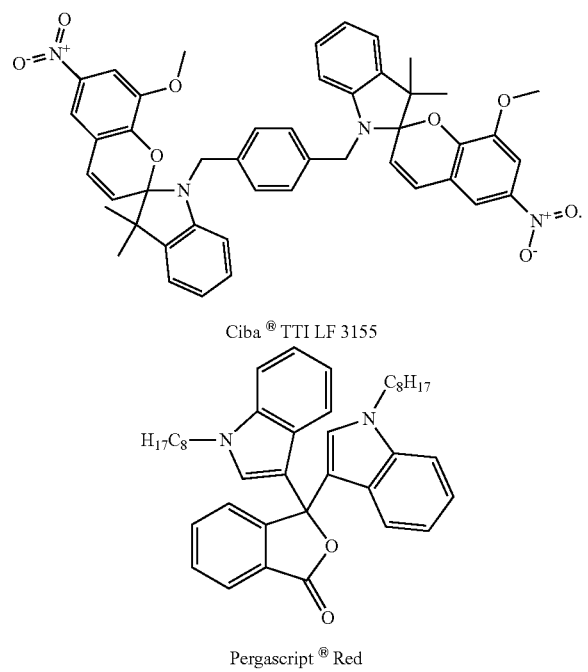

Ciba® TTI LF 3155

Pergascript® Red

When exposed Q-SUN conditions as described in the experiments which follow, the initial colorless sample (0 min) changes to a blue color which fades (15-30 min) and a magenta color appears (30-60 min), finally becoming a dark magenta at 90-120 min. Similar results are obtained when the samples are exposed to sunlight.

Addition of from 0.1 to 5% by weight of photosensitizer or energy transfer agent to the above ink will increase the rate of color formation.

Obviously, other colors are formed using other dyes and chromogenic materials and the initial unexposed ink etc need not be colorless as stated above. Other non-photochromic or non-chromogenic colorants may also be present.

Addition of a yellow pigment to the above ink provides a printed sample wherein an initial yellow color changes to a green color and finally becomes red.

The rate of color changes can be altered by using other dyes and chromogenic materials or by changing the concentrations of these components. For example, effect pigments, such as those based on silica flakes or aluminum flakes can also be used in the present compositions to give, for example, a metallic appearance to the colors formed. Typical amounts of effect pigments range 1% to 10% by weight. The presence of effect pigments tends to slow down the rate of color development.

When using the present multi color changing composition in a dosimeter, the ink or coating containing the composition can be applied to almost any substrate to which the ink or coating will adhere, including natural or synthetic polymers, paper and paper product, metals such as metal foils, glass, ceramics etc.

The color intensity and the rate of color development often depends on the thickness of the coating or article, the higher the thickness the greater the color intensity, as well as on the intensity of activating light.

When preparing a dosimeter to alert a person to the amount of UV from sunlight one has been exposed to, substrates which receive the ink or coating such as fabrics, paper products, polymer films, and foils are common, but not exclusive, for example a molded, i.e., shaped, plastic substrate may be used.

Of course, the color changing composition can be incorporated into a dosimeter by processing into a thermoplastic article but is more often applied as an ink or coating on a substrate, or, for example, the composition can be processed into a thermoplastic film or other article which is comprised by the dosimeter by, for example, laminating or adhering the film to a substrate.

Frequently, as common in the field, the dosimeter includes a strip, block or other design such as a printed shape of a color or colors as reference that match the color that the inventive composition appears as at specific intervals of UV exposure.

The dosimeter may be in the form of a decal, tattoo, patch, sleeve, belt, band, bracelet, broach, necklace, label, disc, packaging material or any article which can be held in an appropriate place on a person or other object. The dosimeter may comprises various layers including a visibly transparent layer over the color changing composition, other support or protective layers, adhesives and the like. Obvious variants on the construction of the final article comprising the color changing composition are well known.

The examples which follow illustrate the invention, without limiting it ("%" are by weight where not otherwise specified):

Preparation of Inks

EXAMPLE 1

14% VYHH solution is prepared by mixing 602 grams of ethyl acetate and 98 grams of VYHH resin (vinyl chloride-vinyl acetate copolymer). To 31 grams of the 14% VYHH solution in a 4 oz. wide mouth glass jar is added 0.09 grams of LF 3155, 0.18 grams Pergascript® Red, 0.22 grams of Irganox® E 201 (comprising vitamin E), and 60 grams of glass beads. The jar is placed in a Skandex® mixing machine and the mixture dispersed for 60 min. The final ink is 2% LF 3155, 4% Pergascript® Red and 5% Irganox® E 201 based on resin solids.

EXAMPLE 2

Following the procedure of example 1, an ink containing 4% LF 3155, 4% Pergascript® Red and 8% Irganox® E 201 based on resin solids is prepared.

EXAMPLE 3

Following the procedure of example 1, an ink containing 2% LF 3155, 4% Pergascript® Red and 8% Irganox® E 201 based on resin solids is prepared.

EXAMPLE 4

Following the procedure of example 1, an ink containing 2% LF 3155, 8% Pergascript® Red and 10% Irganox® E 201 based on resin solids is prepared.

EXAMPLE 5

To the ink from example 3 is added 1% by weight based on resin solids of an aluminum effect pigment (Visionare®, Eckardt) and the resulting mixture is dispersed in a Skandex® mixer for 60 min.

EXAMPLE 6

To the Ink from example 3 is added 10% by weight based on resin solids of an aluminum effect pigment (Visionare®, Eckardt) and the resulting mixture is dispersed in a Skandex® mixer for 60 min.

EXAMPLE 7

To 80 grams of 14% VYHH Solution in a 4 oz. wide mouth glass jar is added 0.45 grams of Pergascript® Red and 0.90 grams of Ciba® Irganox® E 201, and the mixture us stirred using a magnetic stirrer until dissolved. The final ink is 4% Pergascript® Red and 8% Irganox® E 201 based on resin solids.

EXAMPLE 8

To 20 grams of Glascol® LS16 (Carboxylated acrylic copolymer) and 20 grams of Joncryl® 74A (acrylic emulsion, BASF) in a 4 oz. wide mouth glass jar is added 0.25 grams of Tego® Foamex® 845 defoamer (Degussa), 4.84 grams of distilled water, 1.58 grams of LF3155, and 40 grams of glass beads. The jar is placed in a Skandex® mixing machine and the mixture dispersed for 60 min in a Skandex® machine. The final solution is 10% by wt. LF 3155 based on resin solids.

EXAMPLE 9

To 25 grams of 14% VYHH solution in a 4 oz. wide mouth glass jar is added 0.18 grams of LF 3155 pigment and 50 grams of glass beads. The jar is placed in a Skandex® mixing machine and the mixture dispersed for 60 min. The final solution is 10% by wt. LF 3155 based on resin solids.

EXAMPLE 10

To 31 grams of 14% VYHH Solution in a 4 oz. wide mouth glass jar is added Irgalite® Yellow BAW (0.09 g), LF 3155 (0.09 g), Pergascript® Red (0.17 g), Irganox® E 201 (0.41 g) and 30 grams of glass beads. The jar is placed in a Skandex® mixer and the mixture dispersed for 60 min. The final ink is 2% Irgalite® Yellow BAW 2%, 2% LF 3155, 4% Pergascript® Red and 9% Irganox® E 201 based on resin solids.

EXAMPLE 11

Example 10 is repeated, except that 0.18 g of LF 3155 is added.

EXAMPLE 12

A mixture of 14% VYHH Solution, LF 3155 (2%), Pergascript® Red (4%) and
Irganox® E (8%) is dispersed using 30 grams of glass beads in a Skandex® mixer for 60 min.
Light Exposures

EXAMPLE 13

Color Indicators from Inks 2, 3, 4, 5, and 6, Artificial Light Exposure

Liquid samples of the inks from examples 2-6 are individually applied to separate 7⅝"×10¼"×0.007" clear polyester sheets using a Gardco® automatic drawdown machine, model DP-8201 with a 16"×½" rod wound with a wire of diameter 0.050" at a constant speed of 1.2 inches per second. The coated sheets are air dried overnight and the coated polyester sheets are cut into indicator samples of approximately 10 mm×30 mm which are taped to cardboard and placed inside a Q-SUN® accelerated weatherometer (WOM) supplied by the Q-Panel Company, model Xe-1, with a xenon lamp with a constant irradiance of 0.55 W/m$^2$@ 340 nm using a continuous light cycle with no water spray, internal temperature of 55° C., total exposure time of 120 minutes. The samples are placed in the device at a constant distance from the lamp and remain stationary throughout the exposure. Replicate samples are tested to insure reproducibility.

Indicator samples prepared using inks 2, 3 and 4 behave similarly, with some minor variations in rates and color intensity. That is the initial colorless sample (0 min) changes to a blue color then fades (15-30 min) and a magenta color begins to appear (30-60 min), finally becoming dark magenta at 90-120 min. Times are cumulative.

Indicator samples prepared using inks 5 and 6, which contain the aluminum effect pigment also show color changes, but the color intensity is much lower visually. That is the initial colorless sample (0 min) changes to a weak blue color which fades (15-30 min) and a magenta color begins to appear (30-60 min), developing a weak red color at 90-120 min.

EXAMPLE 14

Color Indicators from Inks 2, 3, 4, 5, and 6, Sunlight Exposure

Indicator samples prepared using inks form examples 2-6 on polyester sheets as above and cut into individual 2×2"

samples which are then exposed outdoors between 10 AM to 3 PM, at Tarrytown N.Y. (USA), clear sky, temperature between 60-95° F. The initial colorless sample (0 min) changes to a blue color then fades (15-30 min) and a magenta color begins to appear (30-60 min), finally becoming dark magenta at 90-120 min.

Dual Layer Color Indicators from Inks 7, 8 and 9

EXAMPLE 16

Photochomic Ink Over Chromogenic Ink

Polyester sheets are coated following the draw down procedure above, first using the chromogenic ink from example 7 and then after drying, a second coating using the photochromic ink from example 8 is applied over the first coating using the same procedure.

EXAMPLE 17

Chromogenic Ink over Photochomic Ink

Polyester sheets are coated following the draw down procedure above, first using the photochromic ink from example 8 and then after drying, a second coating using the chromogenic ink from example 7 is applied over the first coating using the same procedure.

EXAMPLE 18

Chromogenic Ink over Photochomic Ink

Polyester sheets are coated following the draw down procedure above, first using the photochromic ink from example 9 and then after drying, a second coating using the chromogenic ink from example 7 is applied over the first coating using the same procedure. The dual layer sheets of Examples 16, 17 and 18 are cut into 10 mm×30 mm samples, mounted on cardboard and exposed inside a Q-SUN® accelerated weatherometer as above.

The indicator of Example 16 turns blue and then the blue fades, but no magenta or red is observed. It is assumed that the UV opaque layer formed by the decomposition of the photochromic dye prevents light reaching the bottom layer.

The indicators of Examples 17 and 18 however turn blue, the blue fades and then a red color appears and becomes dark red over a time period of 0-120 minutes.
Indicators from Inks 10, 11 and 12

EXAMPLE 19

Liquid samples of the inks from examples 10, 11 and 12 containing the color changing composition and the pigment Irgalite® Yellow BAW are individually applied to separate 7⅝"×10¼"×0.007" clear polyester sheets according to the procedure above (example 13). The coated sheets are air dried overnight and cut into indicator samples of approximately 10 mm×30 mm and subject to Q-SUN exposure as above. The color of each sample changes from yellow to green then to red in 0-150 min.

EXAMPLE 20

Polyester sheets are coated following the draw down procedure above, using an ink prepared by dispersing Irgalite® Yellow BAW, 2% by weight based on resin solids, in the 14% VYHH solution in the presence of glass beads on a Skandex® mixer for 60 min. After drying, a second coating using the photochromic ink from Example 3 is applied over the first coating using the same procedure. After drying the indicator is exposed in Q-SUN as above. The color changes from yellow to green then to red in 0-150 min.

EXAMPLE 21

The procedure of example 20 is repeated using a bismuth vanadate yellow pigment in place of Irgalite® Yellow BAW. Upon Q-SUN exposure the color changes from yellow to green then to red over 150 min.

EXAMPLE 22

The procedure according to example 21 is repeated except that 1% of isopropylthioxanthone is added to the ink along with the color changing composition. Upon Q-SUN exposure the color changed from yellow to green then to red in 120 min, whereas the samples without isopropylthioxanthone changes from yellow to green then to red in 150 min.

EXAMPLE 23

A dual layer system as in example 20 is prepared, except the second ink contained 3% Ciba® LF 3155, 4% Pergascript® Red and 8% Irganox® E, and then exposed in the Q-SUN® as above. The color changes from yellow to green then to red in 0-120 min.

EXAMPLE 24

The procedure of example 23 is repeated except that the second ink contained 10% LF 3155, 4% Pergascript® Red and 8% Irganox® E in a water borne system. Upon exposure in the Q-SUN®, the color changes from yellow to green then to red in 0-150 min, but the colors are dull compared to example 21.

The invention claimed is:
1. A photoactive color changing ink, coating, plastic, or printed article comprising:
A) an organic polymer and
B) from about 2 to about 75 weight %, based on the total weight of components A and B, of a multi-color photoactive color changing composition comprising,
a) from 1 to 5 parts by weight of one or more photochromic material, an organic photochromic dye, wherein the photochromic material is an organic spiropyran or spirooxazine photochromic dye of the formulae:

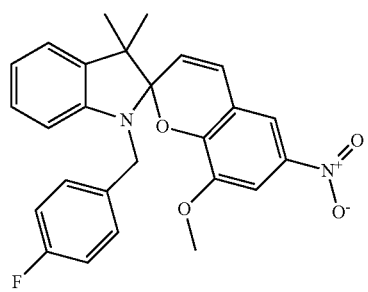

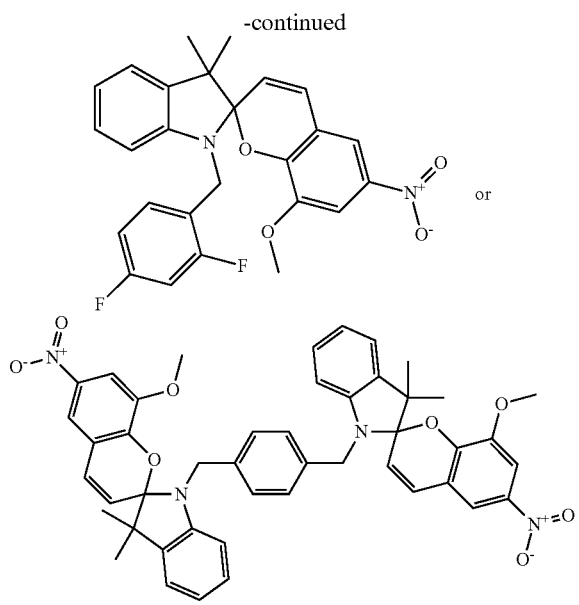

b) from 1 to 20 parts by weight of one or more phenolic photolatent acid, wherein the phenolic photolatent acid b) is a hindered phenol selected from the group consisting of alkylated monophenols, alkylthiomethylphenols, hydroquinones, alkylated hydroquinones, tocopherols, alkylidenebisphenols, hydroxybenzylated malonates, aromatic hydroxybenzyl compounds, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenyl acetic acid, and amides of β-(3,5-di-tert-butyl-4-hydroxyphenyl)propionic acid, and c) from 1 to 10 parts by weight of one or more acid sensitive chromogenic color former of the formula I

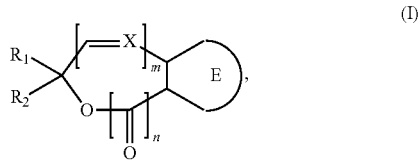

wherein $R_1$ and $R_2$ independently of each other are $C_6$-$C_{14}$aryl or $C_5$-$C_{14}$heteroaryl, wherein the aryl or heteroaryl optionally are substituted by one or more $C_1$-$C_{12}$alkyl, $C_1$-$C_{12}$alkoxy, $C_1$-$C_{12}$dialkylamino, $C_1$-$C_{12}$alkylamino, $C_6$-$C_{14}$aryl, $C_6$-$C_{14}$arylamino, di($C_1$-$C_{14}$aryl)amino or halogen; or $R_1$ and $R_2$ together form a ring or ring system, optionally comprising one or more heteroatoms selected from the group consisting of O, S and N;

m is 0 and n is 1;

X is CH or N;

E denotes a $C_6$-$C_{14}$aryl or $C_5$-$C_{14}$heteroaryl ring or ring system, wherein the $C_6$-$C_{14}$aryl or $C_5$-$C_{14}$heteraryl ring or ring system optionally is substituted by one or more $C_1$-$C_{12}$alkyl, $C_1$-$C_{12}$alkoxy $C_1$-$C_{12}$alkylamino, $C_1$-$C_{12}$dialkylamino, $NO_2$, CN or halogen, wherein the parts by weight of a), b) and c) are based on the total weight of A) and B); and wherein, a weight ratio of color former component c) to photolatent acid component b) ranges from 1:10 to 2:1, and a ratio of component a) to the combined weight of components b) and c) is from 1:20 to 2:1.

2. The photoactive color changing ink, coating, plastic, or printed article according to claim 1, wherein the compound of formula I is a compound of the formula

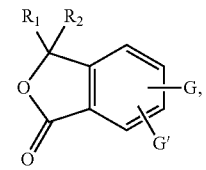

wherein

G and G' are independently H, $C_1$-$C_{12}$alkyl, $C_1$-$C_{12}$alkoxy $C_1$-$C_{12}$alkylamino, $C_1$-$C_{12}$dialkylamino, $NO_2$, CN or halogen, $R_1$ and $R_2$ are selected from the group consisting of phenyl, phenyl substituted by $C_1$-$C_{12}$alkyoxy, phenyl substituted by $C_1$-$C_{12}$dialkylamino, indole, indole substituted by $C_1$-$C_{12}$alkyl, $C_1$-$C_{12}$alkoxy, $C_1$-$C_{12}$dialkylamino and/or halogen, pyrazol and pyrazol substituted by $C_1$-$C_{12}$alkyl, $C_1$-$C_{12}$alkoxy, $C_1$-$C_{12}$dialkylamino and/or halogen, or $R_1$ and $R_2$ together form a ring or ring system selected from the group consisting of

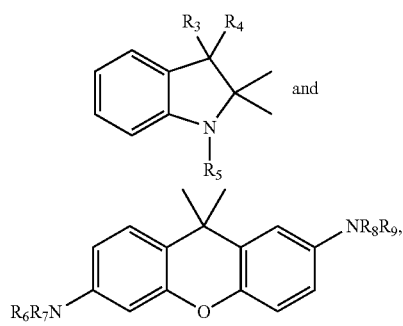

wherein $R_3$, $R_4$, $R_5$ are $C_1$-$C_{24}$alkyl, and $R_6$-$R_9$ are hydrogen, $C_1$-$C_{24}$alkyl, $C_6$-$C_{14}$aryl or phenyl-$C_1$-$C_6$alkyl, wherein the aromatic rings of the $C_6$-$C_{14}$aryl and phenyl-$C_1$-$C_3$alkyl substituents are optionally substituted by one or more $C_1$-$C_{12}$alkyl, $C_1$-$C_{12}$alkoxy, hydroxyl and/or halogen.

3. The photoactive color changing ink, coating, plastic, or printed article according to claim 1, wherein the compound of formula I is

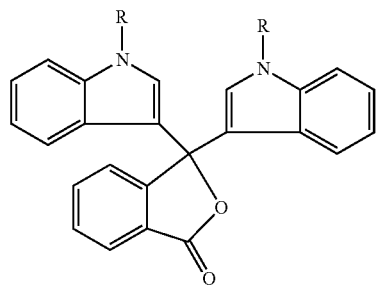

-continued

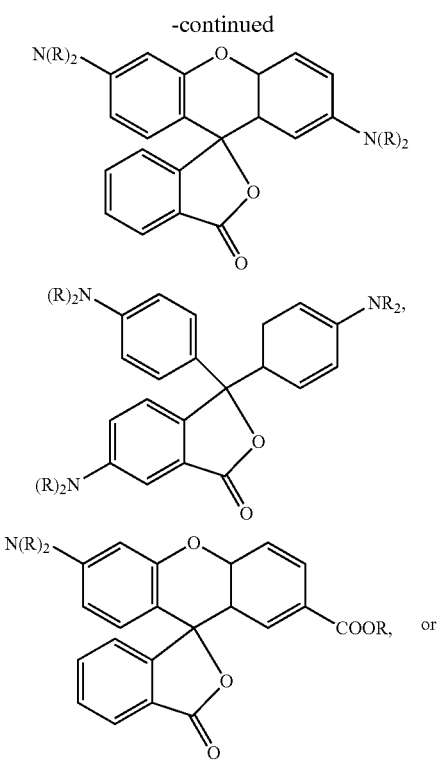

wherein each R is independently hydrogen or $C_1$-$C_{12}$alkyl.

4. The photoactive color changing ink, coating, plastic, or printed article according to claim 1 which additionally comprises an organic or inorganic pigment.

5. A dosimeter comprising a photoactive color changing ink, coating, plastic, or printed article according to claim 4.

6. The photoactive color changing ink, coating, plastic, or printed article according to claim 1, wherein the photolatent acid b) is a tocopherol.

7. A dosimeter comprising a photoactive color changing ink, coating, plastic, or printed article according to claim 1.

8. The dosimeter according to claim 7 which comprises a photoactive color changing ink or coating adhered to an organic or inorganic substrate.

9. A method for preparing an UV dosimeter which method comprises forming a polymeric film comprising the photoactive color changing ink, coating, plastic, according to claim 1 adhered to a substrate.

10. The method for preparing an UV dosimeter according to claim 9, wherein a photoactive color changing ink is printed onto a surface of the organic or inorganic substrate.

11. The photoactive color changing ink, coating, plastic, or printed article according to claim 1, wherein the organic polymer, is selected from the croup consisting of vinyl acetate copolymers, polyvinyl chlorides, polyvinyl alcohols, polyacrylates and polyesters.

12. Images on paper or paper products, decals, peelable labels, or temporary tattoos comprising the composition of claim 1.

13. Thermoplastic sheets, compression molded articles, pellets, fibers, films or other molded thermoplastic articles comprising the composition of claim 1.

* * * * *